United States Patent
Sanduja et al.

(10) Patent No.: US 6,414,048 B1
(45) Date of Patent: Jul. 2, 2002

(54) CHEMICAL GRAFTING ONTO A SUBSTRATE AND COATING COMPOSITION

(75) Inventors: Mohan Lal Sanduja, Flushing; Paul Thottathil, New Hyde Park; Ella Mayslich; Carl Horowitz, both of Brooklyn, all of NY (US)

(73) Assignees: Sumitomo Electric Fine Polymer, Inc., Osaka (JP); Sumitomo Electric Interconnect Products, Inc., Sunnyvale, CA (US)

( * ) Notice: Subject to any disclaimer, the term of this patent is extended or adjusted under 35 U.S.C. 154(b) by 0 days.

(21) Appl. No.: 09/456,742

(22) Filed: Dec. 7, 1999

(51) Int. Cl.$^7$ .................... C09D 167/06; C09D 175/16; C08J 7/18
(52) U.S. Cl. .......................... 522/42; 522/84; 522/85; 524/845; 524/846
(58) Field of Search .......................... 522/13, 22, 17, 522/24, 27, 29, 83, 90, 96, 182, 120, 121, 117, 116, 84, 85; 524/845, 846

(56) References Cited

U.S. PATENT DOCUMENTS

| | | | |
|---|---|---|---|
| 3,880,580 A | | 4/1975 | Horowitz et al. |
| 3,940,377 A | | 2/1976 | Horowitz et al. |
| 4,421,569 A | | 12/1983 | Dichter et al. |
| 4,451,509 A | * | 5/1984 | Frank et al. ................. 427/519 |
| 4,547,394 A | * | 10/1985 | Herz et al. ................... 427/519 |
| 4,589,964 A | * | 5/1986 | Mayhan et al. |
| 4,603,058 A | * | 7/1986 | Adams |
| 4,730,021 A | * | 3/1988 | Zom et al. |
| 4,868,023 A | | 9/1989 | Ryan et al. |
| 4,969,402 A | | 11/1990 | Chan et al. |
| 5,110,638 A | | 5/1992 | Vogdes et al. |
| 5,232,748 A | | 8/1993 | Horowitz et al. |
| 5,254,611 A | * | 10/1993 | McDermott |
| 5,342,659 A | | 8/1994 | Horowitz et al. |
| 5,360,584 A | | 11/1994 | Hansen et al. |
| 5,360,835 A | * | 11/1994 | Sato et al. ................... 522/149 |
| 5,439,969 A | | 8/1995 | Sanduja et al. |
| 5,552,472 A | | 9/1996 | Kerr et al. |
| 5,656,410 A | | 8/1997 | Van Damme et al. |
| 5,690,863 A | | 11/1997 | Schuman |
| 5,741,548 A | | 4/1998 | Sanduja et al. |
| 5,763,557 A | | 6/1998 | Sanduja et al. |
| 5,853,955 A | | 12/1998 | Towfiq |
| 5,888,578 A | | 3/1999 | Sanduja et al. |
| 5,994,424 A | * | 11/1999 | Safta et al. |
| 6,025,068 A | * | 2/2000 | Pekala |
| 6,166,127 A | * | 12/2000 | Tomko ........................ 524/507 |
| 6,180,181 B1 | * | 2/2001 | Veradi et al. |

FOREIGN PATENT DOCUMENTS

| | | |
|---|---|---|
| GB | 2 028 842 | 3/1980 |
| GB | 2 089 819 | 6/1982 |
| GB | 2 109 781 | 6/1983 |
| GB | 2 275 272 | 8/1994 |
| WO | WO 00/14134 | 3/2000 |

* cited by examiner

*Primary Examiner*—Susan W. Berman
(74) *Attorney, Agent, or Firm*—Stout, Uxa, Buyan & Mullins, LLP; Donald E. Stout

(57) ABSTRACT

A composition and method that provides a chemically grafted coating onto a substrate. The composition comprises an acrylate and a grafting initiator. The acrylate may be a waterborne urethane acrylate. The composition may also comprise resistance agents, adhesion agents, UV curing photoinitators, defoaming agents, and/or deglossing agents. The substrate may be any wood or plastic, but works well with heat shrinkable polyolefin tubing. The composition may also be quick curing such that the coating from the composition may be cured under a D bulb and an H bulb at a rate of 100–160 feet/minute. The coating on the substrate resists delamination and wear. The coating may have indicia printed on the coating, the indicia being composed from ink or other printable materials.

3 Claims, No Drawings

CHEMICAL GRAFTING ONTO A SUBSTRATE AND COATING COMPOSITION

BACKGROUND OF THE INVENTION

1. Field of the Invention

This invention relates to coatings on a substrate, and, more specifically, to coatings that do not delaminate from the substrate and to coatings that are capable of receiving indicia.

2. Description of the Related Art

It is generally known in the art that the surface properties of shaped articles such as polymeric films and fibers can be modified by graft polymerization processes wherein the article is treated with a free radical generating agent such as an organic peroxide or high energy radiation and then contacted with an ethylenically unsaturated monomeric material under conditions wherein the monomer or graft polymer chain is caused to be covalently bonded to the substrate.

One particular process involves the treatment of natural or synthetic polymer substrates containing active hydrogen with an aqueous solution containing a silver salt (silver nitrate), a free radical polymerization catalyst and a free radically polymerizable monomer. The silver salt acts upon the substrate to remove active hydrogen thereby creating active sites or free radicals along the molecular chain and initiating and propagating polymerization of the monomer in conjunction with the free radical polymerization catalyst. The resulting product is a graft copolymer comprising a substrate having a plurality of polymeric side chains covalently bonded thereto. Examples of such processes are disclosed in U.S. Pat. Nos. 3,401,049 and 3,698,931, which are incorporated herein by reference in their entireties. This process is similar to grafting processes disclosed in U.S. Pat. Nos. 5,342,659; 5,439,969; 5,552,472; and 5,741,548, which are incorporated herein by reference in their entireties.

Organic solvent-based coating compositions are known in the art based on compositions curable by condensation reactions and containing polymeric material such as hydroxy terminated polyesters, diesters, acrylics and alkyds and an amino or polyisocyanate crosslinking agent. These formulations are adapted to be applied to a substrate such as metal, heated to drive off the solvent and further heated at temperatures above 80 degrees C. to activate the crosslinking mechanism.

It is known in the prior art that it is difficult to bond ink to certain substrates such as wood-based products and plastics, and even more specifically to polyolefin. The prior art discloses that the substrates may be precoated with a material to which the ink bonds. However, the prior art also discloses that the coatings may delaminate or be otherwise removed from the substrate. This is especially true for plastic substrates that are flexible or heat shrinkable, such as polyolefin tubing.

It is known in the prior art that a substrate may be treated to grow a polymer coating using a process known as chemical grafting. The resulting coating is covalently bonded to the substrate that is resistant to delamination. Chemical grafting involves the activation of the substrate. Once the substrate has been activated, chains of monomers linked by carbon-carbon bonds grow on the substrate as whiskers. These whiskers impart new and desirable properties to the substrate without damaging any of the existing positive characteristics of the substrate.

The chemical grafting processes relies on the fact that many materials; both naturally occurring and synthetic, possess hydrogens which are more active than the "bulk hydrogens." Examples of relatively more active hydrogens include the tertiary hydrogen in polypropylene, the amide hydrogen in proteins, and the hydroxyl hydrogen in polysaccharide.

The chemical grafting process utilizes graft initiators (GI) that have the capacity of removing the active hydrogens and initiating the growth of polymer chains at the site of the removed hydrogen. In the case of polypropylene, the series of reactions is represented as follows:

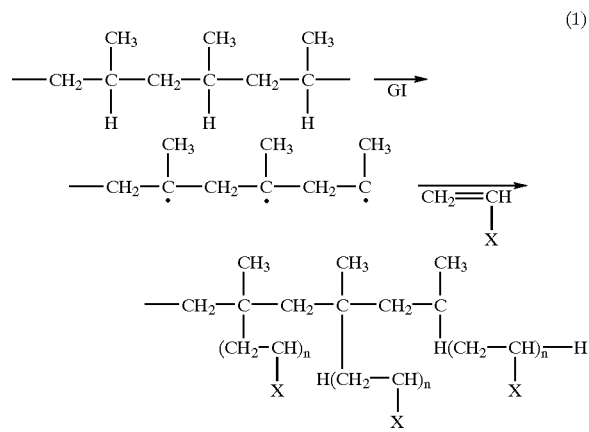

A• represents a free radical, anion or cation, depending on whether the GI removes a hydrogen and one electron, no electrons, or two electrons. The below structure:

represents a unit of vinyl monomer where X governs the property or properties that are obtained with the resulting polymers attached and grown on the substrate. The graft polymer chains are formed from vinyl monomers or monomers containing appropriate functionability, e.g. groups such as hydroxyl, carboxyl, epoxy, amide, amine anhydride. In many instances a mixture of monomers is employed and often more than one property can be altered in one processing step. The polymers, whose length can be controlled, are permanently attached to the substrate. The linkage is between the grafted polymer and the substrate is covalent and cannot be leached or otherwise removed from the substrate absent mechanical means such as abrasion.

SUMMARY OF THE INVENTION

In an aspect of the invention, a composition provides a chemically grafted coating onto a substrate, wherein the composition comprises an acrylate and a grafting initiator. In further aspects of the invention, the acrylate is a waterborne urethane acrylate.

In further aspects of the invention, the composition comprises resistance agent, an adhesion agent, a UV curing photoinitiator, a defoaming agent, and/or a deglossing agent. The resistance agent increases the chemical or mechanical resistance of the coating. In still further aspects of the invention, the resistance agent is an acryl-alkyd emulsion, a polyether, or a polyethylene glycol diacrylate. In other aspects of the invention, the adhesion agent is a polyethylene glycol diacrylate or an ethoxylated trimethylol propane triacrylate monomer. In additional aspects of the invention, the UV curing photoinitiator is 2-hydroxy-2-methyl-1phenyl-propane-1-one.

In an aspect of the invention, the composition comprises VIAKTIN VTE 6155W/50WA at 20–30 parts per weight; RESYDROL VAY 6278W/45WA at 4–5 parts per weight; RESYDROL AY 586 W/28 WA at 5–7 parts per weight; BYK 024 at 0.1–0.2 parts per weight,; FUJI 370 at 1.5–3.0 parts per weight; SR 344 at 0.12–0.20 parts per weight; de-ionized water at 4–50 parts per weight; ferrous ammonium sulfate (0.1% in de-ionized water) at 0.10–0.15 parts per weight; and DARACUR 1173 at 1.2–1.8 parts per weight.

In an aspect of the invention, the composition comprises VIAKTIN VTE 6155W/50WA at approximately 28.95 parts per weight; RESYDROL VAY 6278W/45WA at approximately 4.45 parts per weight; RESYDROL AY 586 W/28 WA at approximately 5.00 parts per weight; BYK 024 at approximately 0.10 parts per weight; FUJI 370 at approximately 1.8 parts per weight; SR 344 at approximately 0.16 parts per weight; de-ionized water at approximately 46.00 parts per weight; ferrous ammonium sulfate (0.1% in de-ionized water) at approximately 0.10 parts per weight; and DARACUR 1173 at approximately 1.55 parts per weight.

In an aspect of the invention, the composition comprises VIAKTIN VTE 6155W/50WA at approximately 28.95 parts per weight; RESYDROL VAY 6278W/45WA at approximately 4.45 parts per weight; RESYDROL AY 586 W/28 WA at approximately 5.00 parts per weight; BYK 024 at approximately 0.10 parts per weight; FUJI 370 at approximately 1.40 parts per weight; SR9035 at approximately 0.20 parts per weight; de-ionized water at approximately 46.00 parts per weight; ferrous ammonium sulfate (0.1% in de-ionized water) at approximately 0.10 parts per weight; and DARACUR 1173 at approximately 1.55 parts per weight.

In an aspect of the invention, the substrate is plastic or wood. In a still further aspect of the invention, the substrate is polyolefin.

In an aspect of the invention, a process for chemically grafting a coating onto a substrate comprising the step of providing a composition comprising a urethane acrylate and a grafting initiator along with the step of coating the substrate with the composition and curing the composition coated on the substrate. Further aspects of the invention include a product made by the process and that the substrate is plastic or wood, such as polyolefin for example.

In a further aspect of the invention, the curing step further comprises curing the composition coated on the substrate under a D bulb and an H bulb at a rate of 100–160 feet/minute. In a still further aspect of the invention, a product is made by the process having the step of curing the composition under the D bulb and the H bulb at the rate of 100–160 feet/minute. In an additional aspect of the invention, the substrate is polyolefin.

In still further aspects of the invention, processes use the compositions described above and products made with these processes, including having polyolefin as a substrate.

In still further aspects of the invention, the processes include the step of applying readable indicia onto the coating. In a still further aspect of the invention, the readable indicia is ink.

DESCRIPTION OF THE PREFERRED EMBODIMENTS

In an embodiment of the invention, a co-polymer, a monomer/prepolymer and a graft initiator are mixed together and coated onto a substrate, such as plastic or wood. The resulting coating is then cured, resulting in a covalently bonded polymer coating on the substrate. In a more preferred embodiment of the invention, the substrate is flexible, such as heat shrinkable polyolefin tubing, and the copolymer comprises a functional group to add flexibility to the bonded polymer coating, with an example of such a functional group being urethane.

In embodiments of the invention, the functional groups of the monomers and prepolymers may consist of hydroxyl groups, carboxyl groups, secondary and/or tertiary amino groups, and epoxy groups. In a preferred embodiment of the invention, the molecular ratio of the reactive components of the mixture are adjusted so that no free groups are left after the reaction is complete. Examples of suitable monomers include ethoxylated trimethyl propane triacrylate, polyethylene gycol (400) diacrylate, sodium vinyl sulfate, ethoxylated bisphenol A dimethacrylate, ethoxylated bisphenol A diacrylate, trifunctional methacrylate ester, trifunctional acrylate ester, alkoxyated diacrylate. The concentration of the monomers in the solution can vary within practically any limits. In a preferred embodiment of the invention, the concentration of monomers is between about 0.1% and about 50% of the formulation and, more preferably, between about 0.1% and about 20%.

In a step of the reaction, one of the terminal hydrogens of the copolymer is covalently bonded to the substrate. This is accomplished by the graft initiator acting as a catalyst. The graft initiator in a preferred embodiment of the invention is ferrous ammonium sulfate which contributes the metal ion $Fe^{++}$. Other embodiments of the invention may use graft initiators that contribute any other suitable metal ion, such as $Fe^{+++}$, $Ag^+$, $Co^{++}$, $Cu^{++}$, and ions of cerium for example. The choice of the metal ion depends of the nature of the substrate. In a preferred embodiment of the invention, only a single ion is used as a graft initiator and not a combination of ions. In a preferred embodiment of the invention the graft initiator ion salt concentration may vary in the rage of about 0.01% to 0.1% by weight of the monomers.

In an embodiment of the invention, the copolymer comprises ethylene vinyl acetate copolymer (EVA) and/or ethylene ethyl acrylate copolymer (EEA), represented as structures (3) and (4), respectively, below.

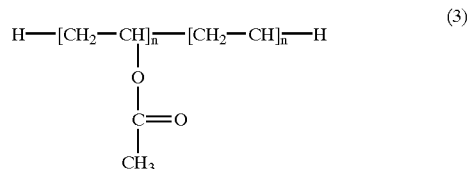

(3)

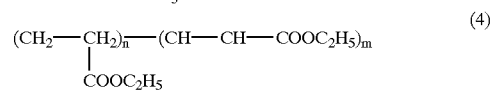

(4)

The EVA and/or and the EEA is grafted to the substrate and is represented as "R–H" in the below structures and reactions. The mechanism of reaction between the EVA and/or the EEA and the monomer/prepolymer is carried out via a free radical mechanism as disclosed below.

In the first stage of the free radical mechanism, the substrate reacts with the graft initiator (GI) to create the radical:

(5)

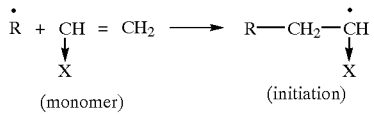

The propagation of the polymer is then initiated by a monomer bonding to the radical:

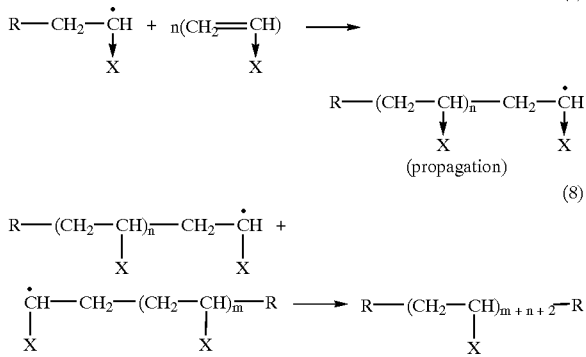

"X" represents side functional groups, which may react between themselves and with additional prepolymers or polymers included in the mixture. The reaction of the side functional groups may result in the polymer coating being crosslinked.

A radical combination reaction is used to terminate the polymer propagation step. In a preferred embodiment of the invention, the radical combination reaction is initiated by a UV curing step. Other embodiments of the invention may have the free radical produced by any other suitable means, such as by supplying a peroxide. The peroxide supplier may be any suitable catalyst, such as benzoyl peroxide, methyl ethyl ketone peroxide, tert butyl hydroperoxide, hydrogen peroxide, and ammonium ferrous sulfate. In an embodiment of the invention, the concentration of the catalyst may vary in the range of about 0.1% to about 5.0% of the polymerization solution and, in a preferred embodiment of the invention, between about 0.1% and about 10%.

In embodiments of the invention, the mixture coating may be applied to the substrate using any suitable method, such a brushing, spraying, and dipping. Embodiments of the invention have mixtures of appropriate properties for the specific application method. For example, a low viscosity mixture may be used for a spraying application.

In a preferred embodiment of the invention, ink or another indicia creating substance is applied to the coating, either before or after curing, to dispose readable indicia on the coating surface. The indicia creating substance may be visible or invisible. The invisible indicia creating substance may be, for example, machine readable, comprise electrically charged or magnetically charged particles, emit electromagnetic wavelengths outside of the visible light wavelength band, or any other suitable application.

EXAMPLE 1

The formula for the coating mixture according to an embodiment of the invention is:

| INGREDIENTS | Parts by Weight |
|---|---|
| VIAKTIN VTE 6155W/50WA | 20–30 |
| RESYDROL VAY 6278W/45WA | 4–5 |
| RESYDROL AY 586 W/28 WA | 5–7 |
| BYK 024 | 0.1–0.2 |
| FUJI 370 | 1.5–3.0 |
| SR 344 | 0.12–0.20 |
| De-ionized Water | 4–50 |
| Ferrous Ammonium Sulfate (0.1% in De-ionized Water) | 0.1–0.15 |
| DARACUR 1173 | 1.2–1.8 |

VIAKTIN VTE 6155W/50WA is the tradename of a waterborne urethane acrylate that acts as a binder to the substrate, which in an embodiment of the invention is polyolefin, through chemical grafting. It also forms the main polymer mix. The urethane part maintains flexibility of the polymer. RESYDROL VAY 6278W/45WA is the tradename of an acryl-alkyd hybrid emulsion that increases the chemical resistance of the polymer and improves its scrub resistance. RESYDROL AY 586W/28WA is the tradename of a polyether that functions as a coalescent for the VIAKTIN VTE-6155W/50WA and the RESYDROL VAY 6278W/45WA, which eliminates the use of solvents and improves chemical resistance of the coating. The three ingredients are obtained from Vianova Resins, Inc., Charlotte, N.C. Other embodiments of the invention may use other suitable chemicals from other suppliers and other embodiments of the invention may only use the urethane acrylate.

BYK 024 is a tradename of a defoamer sold by BYK Chemie USA, Wallingford, Conn. that is mixture of hydrophobic solids and foam destroying polysiloxanes in polyglycol. Other embodiments of the invention may not have the defoamer or may have another suitable defoamer. FUJI 370 is a tradename of a deglossing or flattening agent sold by Fuji Silysia Chemical Ltd., Portland, Oreg., that is silica based. Other embodiments of the invention may not have a flattening agent or may have another suitable flattening agent. SR 344 is a tradename of a polyethylene glycol (400) diacrylate sold by Sartomer Company, Exton, PAS that promotes adhesion and increases the flexibility of the coating. Other embodiments of the invention may not have the polyethylene glycol (400) diacrylate, may have polyethylene glycol diacrylate of another weight, or may have another suitable chemical that promotes adhesion. The ferrous ammonium sulfate is the graft initiator. The Daracur 1173 is a tradename of a 2-hydroxy-2-methyl -1 phenyl-propane-1-one sold by Ciba Geigy Chemicals, Tarrytown, N.Y. It is a liquid UV curing photoinitiator for radical polymerization at a relatively high speed of curing. Other embodiments of the invention may use another UV curing photoinitator. In a preferred embodiment of the invention, the coating on the substrate cures under a D bulb and an H bulb at a speed of 100–160 feet/minute. urethane acrylate coatings in the prior art cure at a speed of 12–30 feet/minute under similar conditions.

In a preferred embodiment of the invention, the compounding procedure of the above formula is to disperse the FUJI 370 into roughly half of the VIAKTIN 6155W/50WA in a high speed mixer, then add the remainder of the VIAKTIN 6155W/50WA and the other ingredients one at a time. After all of the ingredients are added to the batch, reduce the speed of the mixer and continue mixing for approximately twenty minutes. The resulting mixture is filtered and drawn off.

VIAKTIN VTE 6155W/50WA is a waterborne urethane acrylate sold by Vianova Resins, Inc. Vianva Resins, Inc., Charlotte, N.C., provides this product as a 50% water mixture. The features of VIAKTIN VTE 6155W/50WA include: high film hardness, excellent flexibility, high build, almost no yellowing, stable shear forces, and a milky appearance.

VIAKTIN VTE 6155W/50WA is used in UV or Electron-Beam-Curing (EBC) coating for wood. Application can be by spraying, curtain, or roller coating. The application viscosity can be adjusted with deionized water. Prior UV or EB-curing all water must be eliminated. Depending on the film-thickness, a forced drying step of about 5–10 minutes at 60° C. is recommended.

Prior to U-V-curing, a suitable photoinitiator must be added (e.g. Nuvopoi Pl 300, Rahn-Chemie, Irgacur 500, CGE 1700, Darocur 1173: Ciba Geigy). Its quantity depends on the speed of the conveyor belt, the amount of UV-lamps and the thickness of the coating.

Synthetic resins containing water may freeze or get inhomogenous at temperatures below 0° C. When frozen, the product will not suffer and damage, but the necessary regeneration requires extended heat treatment at 40–50° C. with continuous stirring. It is, therefore, recommended to ensure frost-proof storage of such products.

At temperatures up to 25° C. and under exclusion of light storage stability of VIAKTIN VTE 6155W/50WA packed in original containers amounts to at least three months.

VIAKTIN VTE 6155W/50WA further has the following characteristics:

| Technical Data | Unit | Value |
| --- | --- | --- |
| Viscosity<br>Dynamic viscosity ISO 3219/23° C.<br>Cone-and-plate apparatus,<br>sheer rate: 25 s$^{-1}$ | mPas | 1500–4500 |
| PH-value (10% aqueous solution)<br>DIN 53785/20° C. | | 6.4–7.8 |
| Density<br>DIN 53217/20° C. | g/cm$^3$ | approx 1.06 |
| Determination of Water Content<br>DIN 51777 T1 (form of supply) | | approx 50% |
| Flash Point<br>DIN EN 22719 (form of supply) | ° C. | >100 |
| Freeze Stability | ° C. | 0 |

RESYDROL VAY 6278W/45WA is an oxidatively drying ammonia neutralized acrylic alkyd hybrid in aqueous emulsion form. Furthermore, RESYDROL VAY 6278W/45WA is an aqueous acrylic alkyd hybrid without organic co solvents or alkylphenolethoxylates. RESYDROL VAY 6278W/45WA can be used as a sole binder for decorative paints, wood stains and for industrial applications. Vianova Resins, Inc., Charlotte, N.C., supplies RESYDROL VAY 6278W/45WA as a 45% water mixture with a fatty acid content of approximately 15% (as triglyceride) and neutralized with 0.1% ammonia, as salt.

In comparison to the RESYDROL AY 586W/38WA or RESYDROL AY 430, RESYDROL VAY 6278W/45WA exhibits a quicker drying rate and much less yellowing. Additionally like RESYDROL AY 586W/45WA, VAY 6278W/45WA does not contain organic solvents and therefore is environmentally friendly and has a pleasant smell.

Only pigments with very little water-solubility should be used for the production of top coats and primers. Strongly basic pigments are not suitable and may lead to storage stability problems and gelling. Conventional titanium dioxide types (Rutile) without zinc oxide coating should give paint with good storage stability. Because of the high mechanical stability of VAY 6278 pearl and sand mills are suitable. High gloss top coats should utilize a binder-free pigments past for optimum gloss potential. Using Additol VXW 6208 as dispersing agent (5% on pigment) the pigment paste can create systems free of any organic solvents. RESYDROL VAY 6278W/45WA is also very suitable for the production of solvent free wood stains and clear varnishes.

On tannic acid rich woods such as oak or tropical woods like mahogany, drying rate may be delayed and the woods may be discolored, though our own tests on oak showed no discoloring or retarding of the drying rate. Since RESYDROL VAY 6278W/45WA is highly acrylic modified, optimum drying rates can be achieved without using driers like Additiol VXW 6206. Using optical brighteners like Tint Ayd WD 2018 (Daniel Products) leads to virtually non yellowing top coats.

Water containing products may freeze and separate at temperatures below 0° C. According to tests, RESYDROL VAY 6278W/45WA will not suffer form several freeze thaw cycles (a slight increase in viscosity can be observed). Nevertheless it is recommended to store RESYDROL VAY 6278W/45WA away from freezing conditions.

At temperatures up to 25° C. storage stability of RESYDROL VAY 6278W/45WA packed in original containers amounts to at least 9 months.

RESYDROL VAY 6278W/45WA also has the following properties:

| Technical Data | Units | Value |
| --- | --- | --- |
| Dynamic viscosity<br>(f.o.d.) DIN EN ISO 3219,<br>23° C. cone-plate apparatus,<br>Shear rate 25 s$^{-1}$ | mPas | 100–900 |
| pH-value<br>(10% aqueous solution)<br>DIN 53765, 20° C. | | 7.8–8.6 |
| Non-Volatile Content<br>Rapid determination (foil method)<br>DIN 55672 (125° C., 10 min) | % | 43.5–46.5 |
| The following are not continuously determined | | |
| Non-volatile Content<br>DIN EN ISO 3251<br>(1 g, 125° C., 1 hour) | % | 43.5–46.5 |
| Density<br>DIN 53217 T3, (20° C.) | g/cm3 | ca. 1.03 |
| Flash Point<br>DIN EN 22719 | ° C. | >100 |

Note:
DIN, EN and ISO are European manufacturing and measurement standards.

EXAMPLE 2

The formula for the coating mixture according to an embodiment of the invention is:

| INGREDIENTS | Parts by Weight |
| --- | --- |
| VIAKTIN VTE 6155W/50WA | 28.95 |
| RESYDROL VAY 6278W/45WA | 4.45 |
| RESYDROL AY 586 W/28 WA | 5.00 |
| BYK 024 | 0.10 |
| FUJI 370 | 1.80 |
| SR 344 | 0.16 |
| De-ionized Water | 46.00 |
| Ferrous Ammonium Sulfate (0.1% in De-ionized Water) | 0.1 |
| DARACUR 1173 | 1.55 |

EXAMPLE 3

The formula for the coating mixture according to an embodiment of the invention is:

| INGREDIENTS | Parts by Weight |
| --- | --- |
| VIAKTIN VTE 6155W/50WA | 28.95 |
| RESYDROL VAY 6278W/45WA | 4.45 |
| RESYDROL AY 586 W/28 WA | 5.00 |
| BYK 024 | 0.10 |
| FUJI 370 | 1.40 |
| SR9035 | 0.20 |
| De-ionized Water | 8.00 |
| Ferrous Ammonium Sulfate (0.1% in De-ionized Water) | 0.10 |
| DARACUR 1173 | 1.55 |

SR9035 is a tradename of an ethoxylated trimethylol propane triacrylate monomer that is sold by Sartomer Company, Exton Pa. that introduces flexiblity, chemical resistance, and abrasion resistance besides being an adhesion promoter.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A composition for providing a chemically grafted coating onto a substrate, wherein the composition comprises a waterborne urethane acrylate at 20–30 parts per weight; an acryl-alkyd hybrid emulsion at 4–5 parts per weight; a polyether at 5–7 parts per weight; a defoamer at 0.1–0.2 parts per weight; a flattening agent at 1.5–3.0 parts per weight; a polyethylene glycol (400) diacrylate at 0.12–0.20 parts per weight; de-ionized water at 4–50 parts per weight; ferrous ammonium sulfate (0.1% in de-ionized water) at 0.10–0.15 parts per weight; and a 2-hydroxy -2-methyl-1-phenyl-propane-1-one at 1.2–1.8 parts per weight.

2. The composition of claim 1, wherein the composition comprises of a waterborne urethane acrylate at approximately 28.95 parts per weight; an acryl-alkyd hybrid emulsion at approximately 4.45 parts per weight; a polyether at approximately 5.00 parts per weight; a defoamer at approximately 0.10 parts per weight; a flattening agent at approximately 1.8 parts per weight; a polyethylene glycol (400) diacrylate at approximately 0.16 parts per weight; de-ionized water at approximately 46.00 parts per weight; ferrous ammonium sulfate (0.1% in de-ionized water) at approximately 0.10 parts per weight; and a 2-hydroxy-2-methyl-1-phenyl-propane-1-one at approximately 1.55 parts per weight.

3. A composition for providing a chemically grafted coating onto a substrate, wherein the composition comprises a preparation comprising a waterborne urethane acrylate at approximately 28.95 parts per weight; an acryl-alkyd hybrid emulsion at approximately 4.45 parts per weight; a polyether at approximately 5.00 parts per weight; a defoamer at approximately 0.10 parts per weight; a flattening agent at approximately 1.40 parts per weight; an ethoxylated trimethylol propane triacrylate monomer at approximately 0.20 parts per weight; de-ionized water at approximately 46.00 parts per weight; ferrous ammonium sulfate (0.1% in de-ionized water) at approximately 0.10 parts per weight; and a 2-hydroxy-2-methyl-1-phenyl-propane-1-one at approximately 1.55 parts per weight.

* * * * *

UNITED STATES PATENT AND TRADEMARK OFFICE
CERTIFICATE OF CORRECTION

PATENT NO. : 6,414,048 B1
DATED : July 2, 2002
INVENTOR(S) : Sanduga et al.

It is certified that error appears in the above-identified patent and that said Letters Patent is hereby corrected as shown below:

Column 4,
Line 29, after "the" change "copolymer" to -- co-polymer --.
Line 49, Formula 3, change "H-[CH$_2$-CH]$_n$-[CH2-CH]$_n$-H" to
-- H-[CH$_2$-CH]$_n$-[CH2-CH$_2$]$_n$-H --.

Signed and Sealed this

Eleventh Day of May, 2004

JON W. DUDAS
*Acting Director of the United States Patent and Trademark Office*